US006346012B1

(12) United States Patent
Cheng et al.

(10) Patent No.: US 6,346,012 B1
(45) Date of Patent: Feb. 12, 2002

(54) LOCKING CARTRIDGE FOR CONVENIENTLY LOCKING VERY THIN CONNECTOR WITH NEAR-ZERO INDUCTANCE ONTO PC BOARD

(75) Inventors: Bruce C. H. Cheng; Timothy Chen-Yu Yu; Kelly Jui-Yuan Shyu; Szu-Lu Huang, all of Taipei (TW)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/511,057

(22) Filed: Feb. 23, 2000

Related U.S. Application Data

(63) Continuation-in-part of application No. 09/375,470, filed on Aug. 15, 1999.
(60) Provisional application No. 60/096,674, filed on Aug. 15, 1998.

(51) Int. Cl.[7] .............................................. H01R 24/00
(52) U.S. Cl. ..................................................... 439/632
(58) Field of Search ........................... 439/67, 260, 632

(56) References Cited

U.S. PATENT DOCUMENTS

| 4,373,764 A | * | 2/1983 | Ulrich ......................... 439/327 |
| 5,507,651 A | * | 4/1996 | Tanaka et al. ................. 439/67 |
| 5,520,548 A | * | 5/1996 | Hotea et al. ................. 439/358 |
| 5,573,415 A | * | 11/1996 | Fujitani et al. ............. 439/260 |
| 5,971,806 A | * | 10/1999 | Evans et al. ................. 439/632 |
| 5,975,934 A | * | 11/1999 | Ichimura ..................... 439/260 |
| 5,984,704 A | * | 11/1999 | Hashiguchi .................. 439/260 |
| 6,132,224 A | * | 10/2000 | Murakami et al. ............ 439/77 |
| 6,234,822 B1 | * | 5/2001 | Gallin et al. ................. 439/329 |
| 6,238,226 B1 | * | 5/2001 | Schempp et al. ........... 439/260 |

* cited by examiner

Primary Examiner—Brian Sircus
Assistant Examiner—Thanh-Tam Le
(74) Attorney, Agent, or Firm—Bo-In Lin

(57) ABSTRACT

The present invention discloses a direct-current (DC) electric connector that includes plurality of conductive and insulation layers constituting a near-zero inductance connector. The connector further includes a top and a bottom insulation-and-protection covers covering and protecting the plurality of conductive and insulation layers. The top and bottom insulation-and-protection covers having a tapered outer surface for providing a tapered profile along a horizontal direction toward a connector opening for receiving a printed circuit board into the near-zero inductance connector. The connector further includes a locking cartridge for adaptively enclosing the near-zero inductance connector with the printed circuit board inserted therein. The locking cartridge has top and bottom surfaces each engages the top and bottom insulation-and-protection covers respectively for horizontally pushing toward a direction having a gradually increased profile height for generating a vertical pressing force. The vertical pressing force is applied to securely pressing and locking the top and bottom insulation-and-protection covers to the plurality of conductive and insulation layers with the printed circuit board inserted therein.

15 Claims, 6 Drawing Sheets

US 6,346,012 B1

LOCKING CARTRIDGE FOR CONVENIENTLY LOCKING VERY THIN CONNECTOR WITH NEAR-ZERO INDUCTANCE ONTO PC BOARD

This Application is a Continuation-in-Part Application of a previously filed Provisional Application No. 60/096,674 filed on Aug. 15, 1998 and of Formal application Ser. No. 09/375,470 filed on Aug. 15, 1999, by the same Inventors of this Patent Application.

BACKGROUND OF THE INVENTION

1. Field of the Invention

This invention relates generally to the structure and design method for electrical connectors. More particularly, this invention relates to a new configuration and design method for manufacturing and assembling an electrical connector for power supply system. The electrical connector comprises magnetic field canceling conductive layers and locking cartridge to provide a securely locked near zero inductance power supply to reduce the voltage drop due to dynamic variations a load current

2. Description of the Prior Art

A technical difficulty is now faced by the supply industry as the computer and many different kinds of hand held electronic devices are operated with a lower direct-current (DC) voltage, i.e., DC voltage or 3.3 volts or lower, and higher loading current One major concern for providing a DC power supply to the computer or hand held devices is the voltage drop caused by connector inductance caused by variations of the dynamic loading current FIG. 1A is a circuit diagram showing the connector between a voltage power source 10 and a microprocessor 20. A conventional connector typically includes two conductive lines to form a closed electric current loop. Between these conductive lines, a parasitic capacitor 30 and inductor 40 are generated. During a sleeping mode of the microprocessor, there is a very small steady DC current conducted from the power supply system 10 to the microprocessor 20. At an instant of microprocessor wake-up, a rate of instantaneous current variation on the conductive lines is approximately two hundred amperes per microsecond, i.e., $2 \times 10^8$ A/$\mu$s. With an inductance of two nano-Henries (2.0 nH), an instantaneous voltage drop due to the connector inductance is:

$$L\,(dI/dt) = (1 \times 10^{-9})(2 \times 10^8) = 0.2 \text{ volts} \tag{1}$$

Where (dI/dt) is the rate of current variation, L is the inductance. According to this equation, a voltage drop of 0.2 volts is generated due to a high current ramp-up rate. As a result of the connector inductance, the microprocessor 20 experiences a significant voltage drop as that shown in FIG. 1B. At the time of the wake-up of the microprocessor 20, there is an instantaneous increase in current and in response, a sharp voltage drop is experienced by the microprocessor 20. Due to this sharp voltage drop, there is a serious concern that if the voltage is dropped below the minimum operation voltage required by the microprocessor for a period of time, some information might be lost during data processing. Even the voltage drop does not cause a data loss, it may cause a delay in waking up the microprocessor. Performance of the microprocessor is degraded due to the inductance induced voltage drop.

As will be described below, a near-zero inductance connector is disclosed to resolve these difficulties by providing a very thin connector comprising overlapping conductive layers as input and output terminals. Another difficulty is to provide a simplified and cost effective method to assemble the near-zero inductance connector for long term reliable operation. Because of the improved near-zero inductance connector has special layer structure, conventional methods of assembling the connector would either require soldering or bonding processes that would be very complicate and expensive. Or, if these complicate assembling processes are not used, the connector when assembled may not provide sufficient structure reliability for long term operation at a high performance level.

Therefore, an improved connector for connecting the power supply system to the microprocessor and an assembling method are required to resolve these difficulties. Specifically, a new configuration and design method are required for constructing a connector to reduce the inductance to a very low level. A connector provided with a near zero inductance would reduce the voltage drop caused by connector inductance when encountering the variations of dynamic current and also would lower the heat produced. Delay of microprocessor wake-up caused by instantaneous voltage drop can therefore be resolved by providing an electrical connector with very low inductance. Additionally, a novel locking cartridge is disclosed to securely lock the connector comprising conductive and insulation layers onto the printed circuit board without requiring complicated soldering or bonding processes to form a reliable connector to PCB attachment in implementing this novel connector.

SUMMARY OF THE PRESENT INVENTION

It is therefore an object of the present invention to provide a novel configuration and method of design and manufacturing of a connector for providing power to a microprocessor. The novel and improved connector is to significantly reduce the connector inductance during the time when there is a great rate of current variations such that the aforementioned limitations and difficulties encountered in the prior art can be overcome.

Specifically, it is an object of the present invention to provide a configuration and method of design and manufacturing of a connector for providing power to a microprocessor having a current conduction configuration with the current generated magnetic field canceled out By substantially canceling out the current generated-magnetic field, the inductance is reduced to a very low level. The voltage drop and heat production caused by connector inductance can be significantly reduced. Furthermore, a novel locking cartridge for engaging specially tapered insulation and protection cover for converting a horizontal pushing force into a vertical pressing force to securely pressing and locking multiple layers of conductive current transmission layers and insulation layer.

Another object of the present invention is to provide a configuration and method of design and manufacturing of a connector by employing parallel conductive layers for conducting DC currents wherein the current generated magnetic fluxes are mutually canceled out This novel configuration is employed on both the input end and the output end such that connector inductance can be substantially eliminated.

Another object of the present invention is to provide a configuration and method of design and manufacturing of a connector by employing parallel conductive layers for conducting DC currents insulated by a heat conductive insulation layer. Furthermore, the connector is assembled and protected by a heat conductive insulation layer such that heat generated through current conducting in the connector can be more effectively removed.

Briefly, in a preferred embodiment, the present invention discloses a direct-current (DC) electric connector that includes plurality of conductive and insulation layers constituting a near-zero inductance connector. The connector further includes a top and a bottom insulation-and-protection covers covering and protecting the plurality of conductive and insulation layers. The top and bottom insulation-and-protection covers having a tapered outer surface for providing a tapered profile along a horizontal direction toward a connector opening for receiving a printed circuit board into the near-zero inductance connector. The connector further includes a locking cartridge for adaptively enclosing the near-zero inductance connector with the printed circuit board inserted therein. The locking cartridge has top and bottom surfaces each engages the top and bottom insulation-and-protection covers respectively for horizontally pushing toward a direction having a gradually increased profile height for generating a vertical pressing force. The vertical pressing force is applied to securely pressing and locking the top and bottom insulation-and-protection covers to the plurality of conductive and insulation layers with the printed circuit board inserted therein.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
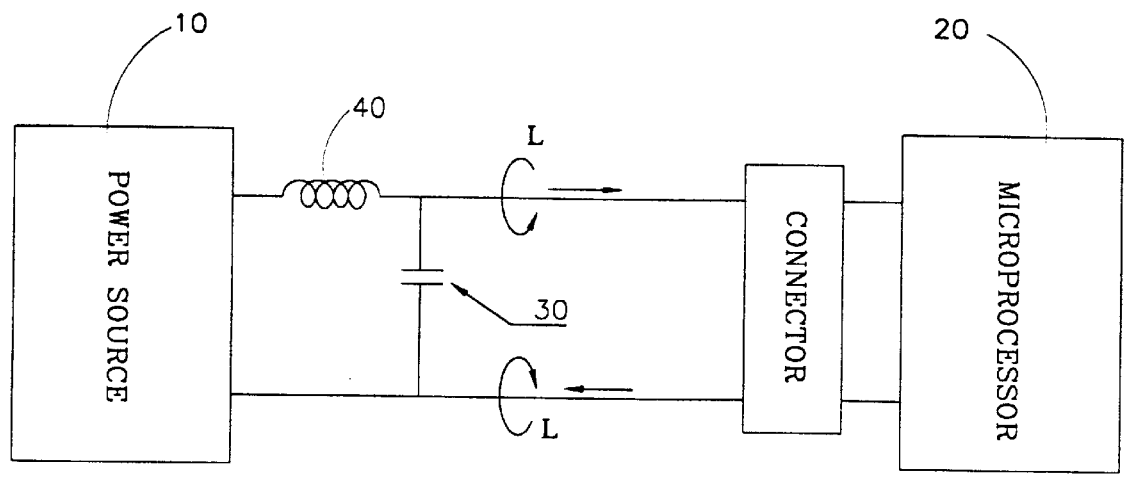
FIG. 1A is a circuit diagram showing the connection between a power supply to a microprocessor having a parasitic capacitor and a parasitic inductor.
Figure 1B:
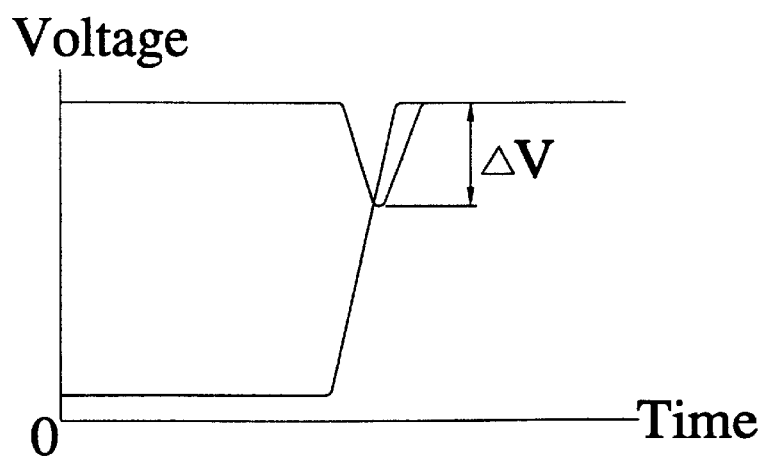
FIG. 1B is a diagram showing the variations of current and voltage of the connector at the time when the microprocessor wakes up from a sleeping mode.
Figure 2A:
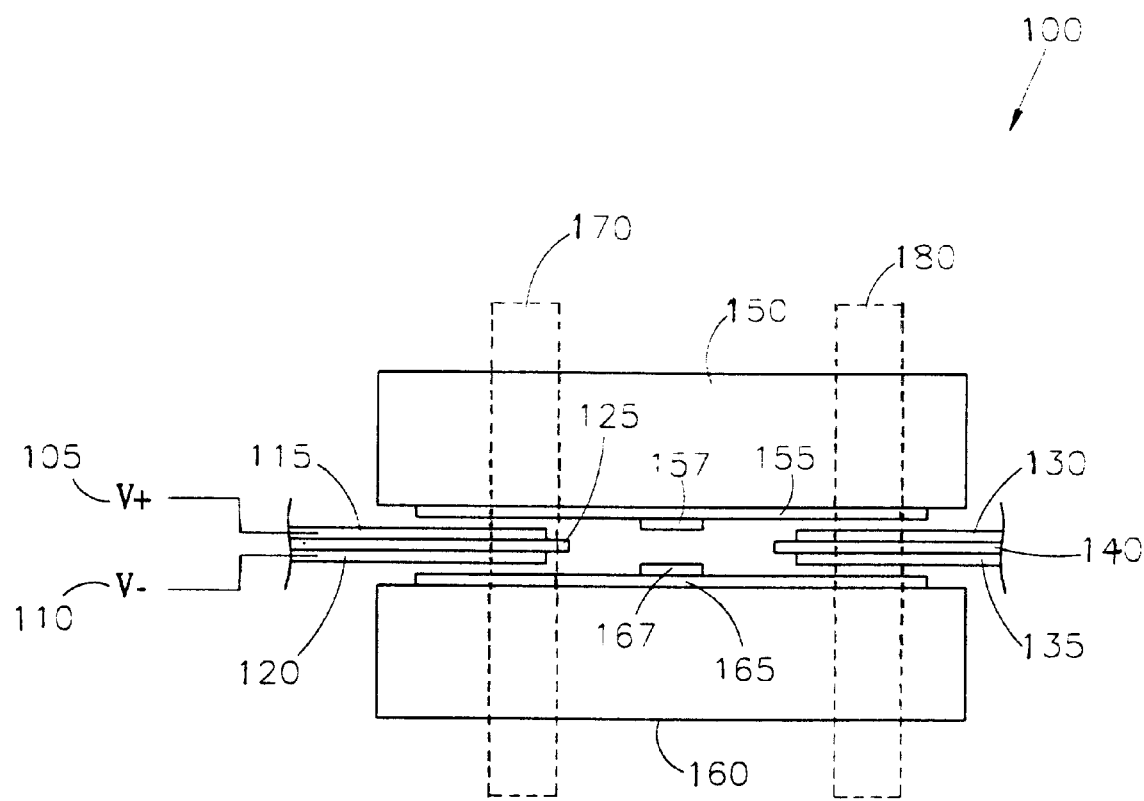
FIGS. 2A and 2B are respectively cross sectional view and perspective view of a connector of this invention where the current generated magnetic fluxes are mutually canceled out.
Figure 2B:
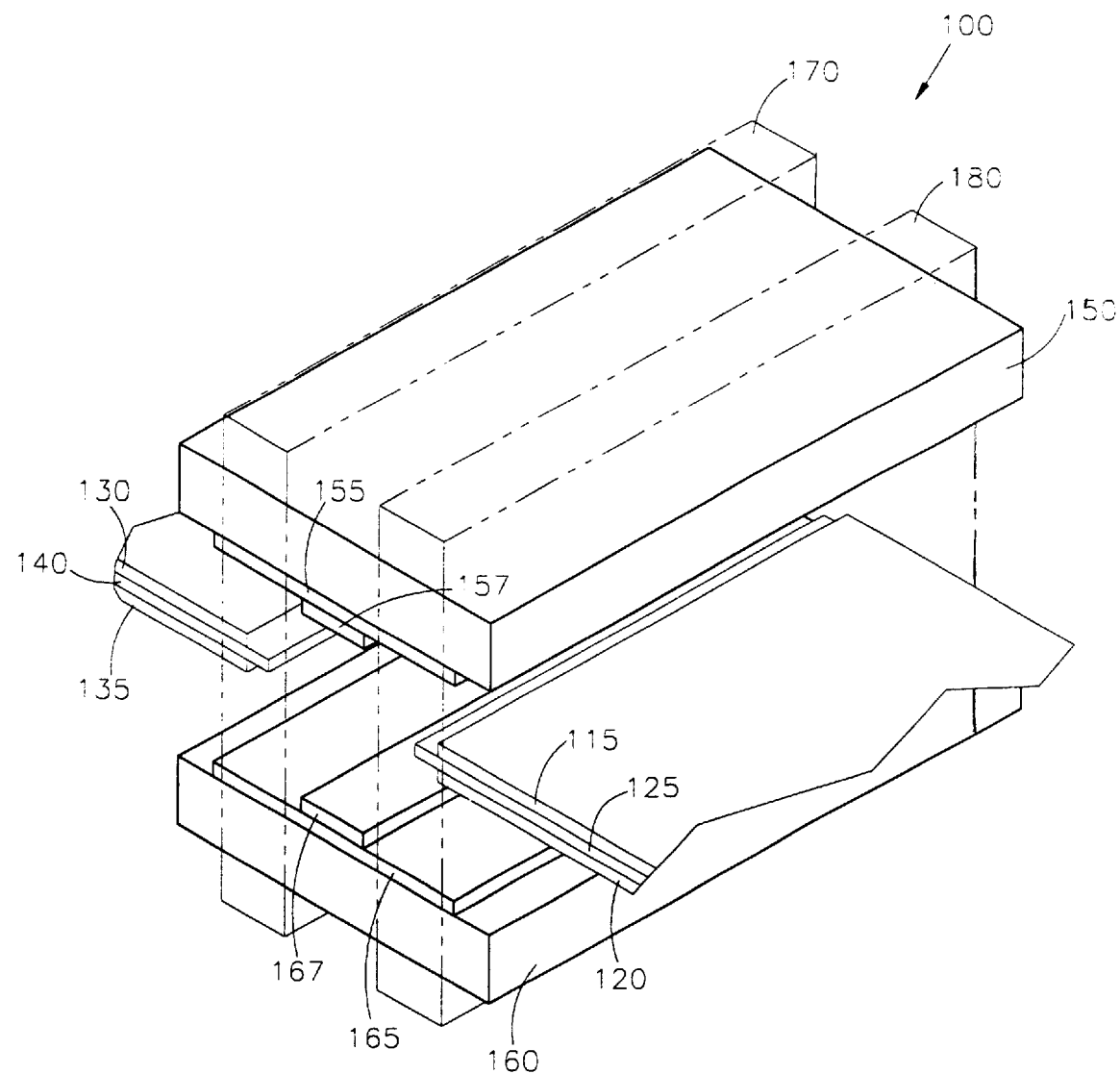

FIGS. 2A and 2B are respectively a cross sectional view and a perspective view of a novel electrical connector with a near zero inductance. The electrical connector 100 includes an input end for connecting to a positive voltage electrode 105 and a negative electrode 110. The positive electrode 105 connected to an input high voltage thin conductive layer 115 and the negative electrode 110 connected to an input low voltage thin conductive layer 120. The input high-voltage thin conductive layer 115 is insulated from the input low voltage thin conductive layer 120 by an input insulation layer 125. The electrical connector 100 further includes an output end. Similarly, the output end includes an output high voltage thin conductive layer 130 and an output low voltage thin conductive layer 135 insulated by an output insulation layer 140. These conductive layers insulated by an insulation layer are clipped between a top insulation layer 150 and a bottom insulation layer 160. The top insulation layer 160 bottom insulation layer 160 each has an inner conductive layer 155 and 165 respectively. The inner conductive layer 155 is in electrical contact with input the high-voltage thin conductive layer 115 and the output high voltage thin conductive layer 130. The inner conductive layer 165 is in electrical contact with input the low-voltage thin conductive layer 120 and the output low voltage thin conductive layer 135. The top and bottom insulation layer 150 and 160 are composed of electrical insulation material with high coefficient of heat conductivity. Preferably, such layers may be insulation layers composed of Kapton produced by DuPont. The top and bottom inner conductive layers 155 and 165 are further insulated from each other by an inner insulation layer 157 and 167 respectively attached at the inner surface to the inner conductive layer 155 and 165 facing each other. It is therefore assured that inner conductive layer 155 will not shorted to the inner conductive layer 165. Two clips 170 and 180 are then applied to clip the top insulation layer 150 and the bottom insulation layer 160 together to keep these conductive and insulation layers securely in fixed positions.

Figure 3:
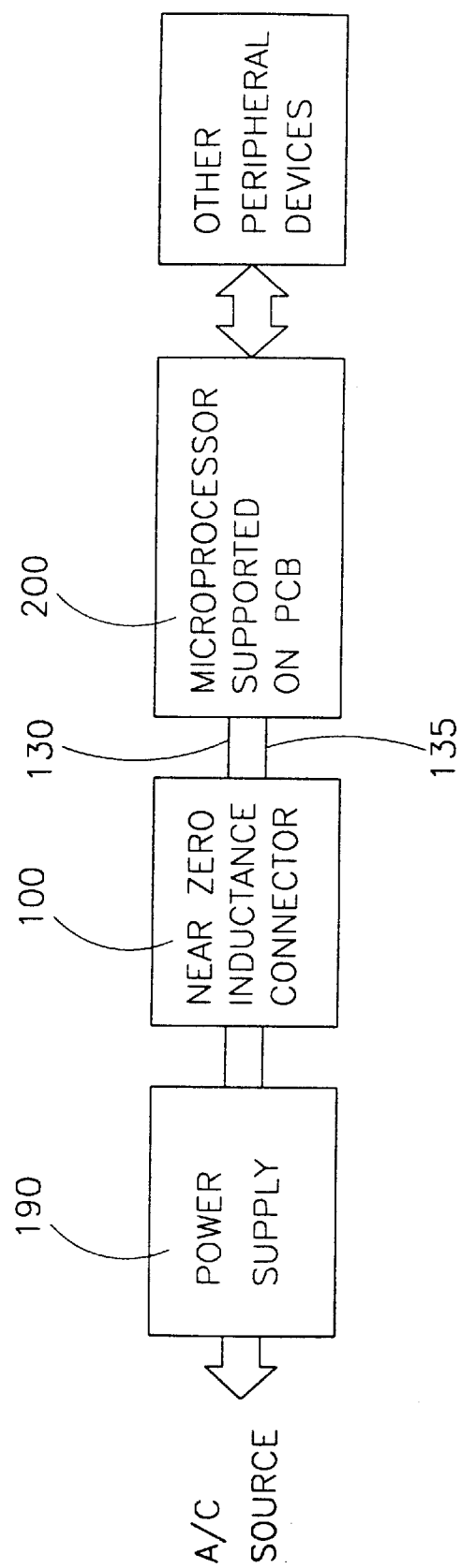
FIG. 3 is a functional block diagram showing a near-zero inductance connector of this invention connected between a power supply and a computer for providing a DC voltage.

The electric connector 100 provides several advantages over the conventional connectors. First advantage of this connector 100 is a very low inductance of this connector. The near-zero inductance is the result of the special structure. Because of the special structure, the high voltage conductive layers 115 and 130 are immediately adjacent and parallel to the low voltage conductive layers 120 and 135. Therefore, the magnetic field produced by variations of current transmitting through the high voltage layers, layers 115 and 130 are almost totally canceled out by the magnetic field produced by corresponding current variations in the low voltage conductive layers 120 and 135. FIG. 3 illustrates the cancellation of the magnetic fluxes produced in the high voltage and the low voltage layers. As shown in the diagram, the high voltage conductive layers are transmitting current in one direction, e.g., to the right, while the low voltage conductive layers are transmitting current in an opposite direction, e.g., to the left. Because the high voltage conductive layers and the low voltage conductive layers are immediately adjacent and parallel to each other, two set of magnetic fluxes are generated by the high-voltage and low-voltage conductive layers. These two sets of magnetic fluxes are substantially equal in magnitude and pointing to opposite in directions. These two sets of magnetic fluxes produced by conducting currents in these high and low voltage conductive layers thus cancel out each other.

According to FIGS. 2A and 2B, the present invention discloses a direct-current (DC) electric connector, which includes an input-end provided for connecting to a DC voltage source and an output end provided for connecting to an electrical device. The input end includes an input high-voltage conductive layer 115 and an input low-voltage conductive layer 120 having substantially a same shape and same size and disposed in parallel to and insulated from the input high-voltage conductive layer 115 by an input insulation layer 125. The output end includes an output high-voltage conductive layer 130 and an output low-voltage conductive layer 135 having substantially a same shape and same size and disposed in parallel to and insulated from the output high-voltage conductive layer 130 by an input insulation layer 145. The connector further includes a high voltage connection layer 155 interconnecting the input high voltage conductive layer 115 to the output high voltage conductive layer 130. The connector further includes a low voltage connection layer 165 of substantially same shape and size with the high voltage connection layer 155. The low voltage connection layer 165 is disposed in parallel to and insulated from the high voltage connection layer 155 interconnecting the input low voltage input conductive layer 120 to the output low voltage conductive layer 135. In a preferred embodiment, the DC electric connector further includes a first insulation and protection cover overlying the high voltage connection layer and a second insulation and protection cover overlying the low voltage connection layer. The connector 100 further includes a clipping means, e..g., clipping means 170 and 180, for clipping and securely keeping the first insulation and protection cover 150 and the second insulation and protection cover 160 to pressing down and maintaining the connector 100 as a clipped assembly. In a preferred embodiment, the input insulation layer 125 and the output insulation layer 140 composed of a material of Kapton. In another preferred embodiment, the input insulation layer 125 and the output insulation layer 140 is an insulation layer with a thickness ranging between 0.01 to 0.05 millimeters. In another preferred embodiment, the first insulation and protection cover 150 and the second insulation and protection cover 160 are composed of a material of Kapton.

This invention further discloses a method for manufacturing a direct-current (DC) electric connector. The method includes the steps of. (a) forming an input end for connecting to a DC voltage source by forming an input high-voltage conductive layer and an input low-voltage conductive layer having substantially a same shape and size and disposed in parallel to and insulated from the input high-voltage conductive layer by an input insulation layer; (b) forming an output end for connecting to an electronic device by forming an output high-voltage conductive layer and an output low-voltage conductive layer having substantially a same shape and same size and disposed in parallel to and insulated from the output high-voltage conductive layer by an input insulation layer; (c) forming a high voltage connection layer interconnecting the input high voltage conductive layer to the output high voltage conductive layer; and (d) forming a low voltage connection layer of substantially same shape and size with the high voltage connection layer and disposed in parallel to and insulated from the high voltage connection layer interconnecting the input low voltage input conductive layer to the output low voltage conductive layer. In a preferred embodiment, the method further includes the steps of: (e) employing a first insulation and protection cover for overlying the high voltage connection layer and employing a second insulation and protection cover for overlying the low voltage connection layer; and (f) employing a clipping means for clipping and securely keeping the first insulation and protection cover and the second insulation and protection cover to pressing down and maintaining the connector as a clipped assembly.

In summary, this invention also discloses a direct-current (DC) electric connector 100, which includes a first conductive means, e.g., conductive layers 115, 155 and 130, for connecting a high voltage terminal of a DC voltage source to a high voltage output terminal. The connector further includes a second conductive means, e.g., conductive layers 120, 165, and 135, for connecting a low voltage terminal of a DC voltage source to a low voltage output terminal. The first conductive means and second conductive means are configured to produce respectively a first current-generated magnetic field and a second current-generated magnetic field wherein the first current-generated magnetic field is substantially canceled out by the second current-generated magnetic field. In a preferred embodiment, the connector 100 further includes a heat conductive insulation means, e.g., Kapton layers 125 and 140, to insult the first conductive means and the second conductive means.

This invention further discloses a method for manufacturing a direct-current (DC) electric connector. The method includes the steps of (a) forming a first conductive means for connecting a high voltage terminal of a DC voltage source to a high voltage output terminal; (b) forming a second conductive means for connecting a low voltage terminal of a DC voltage source to a low voltage output terminal; and (c) configuring the first conductive means and second conductive means to produce respectively a first current-generated magnetic field and a second current-generated magnetic field wherein the first current-generated magnetic field is substantially canceled out by the second current-generated magnetic field.

FIG. 3 is a functional block diagram showing the connector 100 with a near-zero inductance of this invention, connected between a power supply 190 and a microprocessor 200. The microprocessor may a high-speed data processing system supported on a printed circuit board (the PCB is well known and not specifically shown). The output high voltage conductive layer 130 and the output low-voltage conductive layer 135 are connected respectively to a high voltage terminal and a ground terminal on the printed circuit board (PCB) of the microprocessor.

According to FIGS. 2 to 3 and above descriptions, this invention further discloses a data handling system. The data handling system includes a power supply 190 and a microprocessor 200 supported on a printed circuit board (PCB). The data handling system further includes an electric connector 100 connected between the power supply and the microprocessor 200 for providing a direct-current (DC) to the microprocessor. The electric connector 100 includes a first conductive means 130 for connecting a high voltage terminal of the power supply to a high voltage output terminal on the PCB. The data handling system further includes a second conductive means 135 for connecting a low voltage terminal of the power supply to a low voltage output terminal on the PCB. And, the first conductive means 130 and second conductive means 135 are configured to produce respectively a first current-generated magnetic field and a second current-generated magnetic field wherein the first current-generated magnetic field is substantially canceled out by the second current-generated magnetic field.

Figure 4:
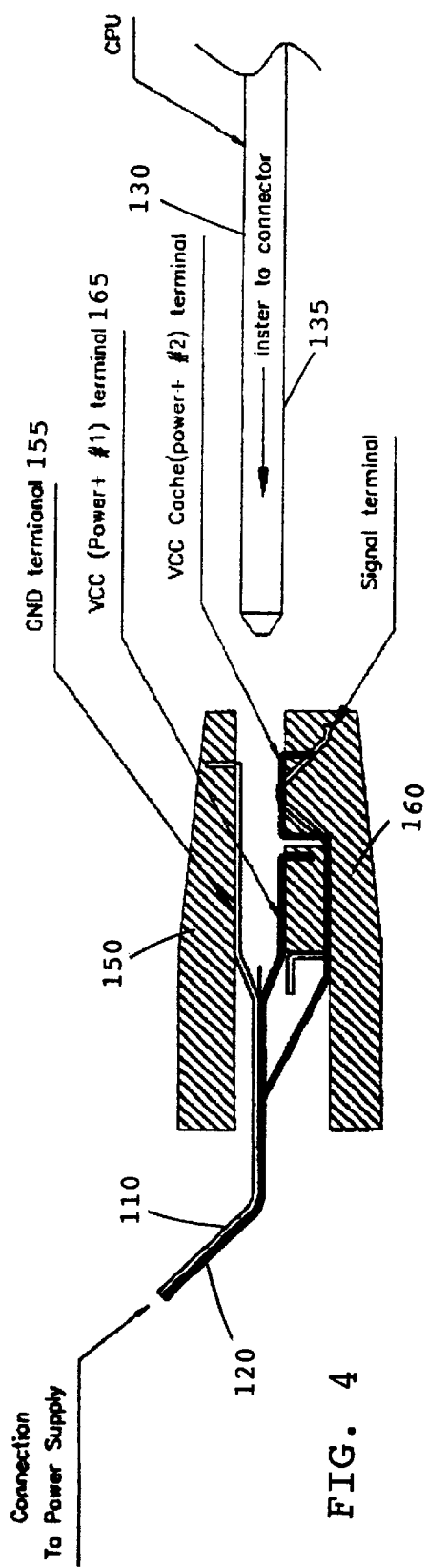
FIG. 4 is a cross sectional view for showing special tapered insulation and protection covers of this invention.

FIG. 4 is a cross sectional view of actual implementation of the near zero inductance connector 100. Specifically, the top insulation and protection cover 150 and the bottom insulation and protection cover are formed with a special tapered outer surface. The connector 100 thus has a special tapered profile having a gradually reduced cross sectional profile height along the horizontal direction toward the opening for receiving the printed circuit board 130.

Figure 5A:
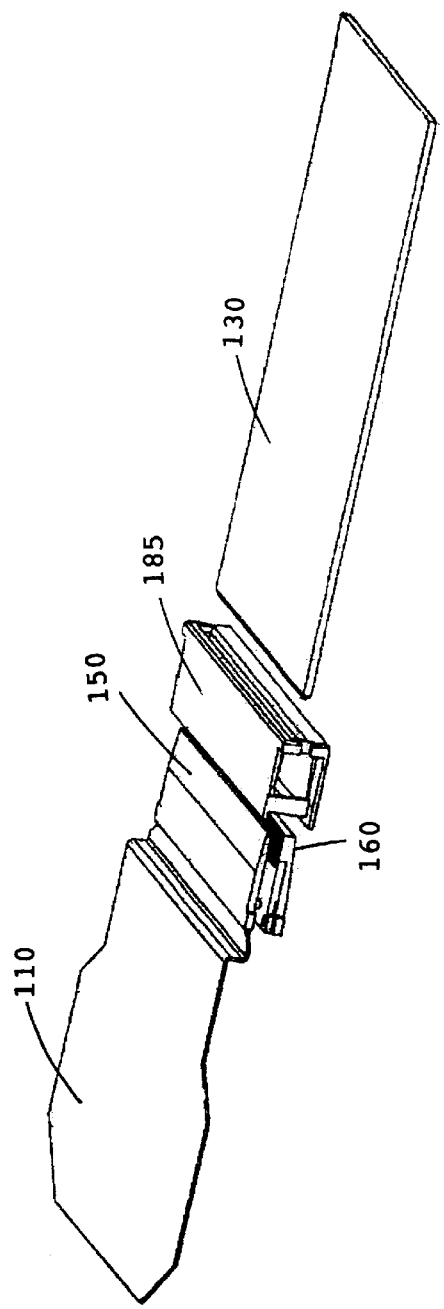
FIG. 5A is a perspective view and FIGS. 5B and 5C are cross sectional views for illustrating a horizontal movement of a locking cartridge to lock the near-zero inductance connector to a print circuit board.
Figure 5B:
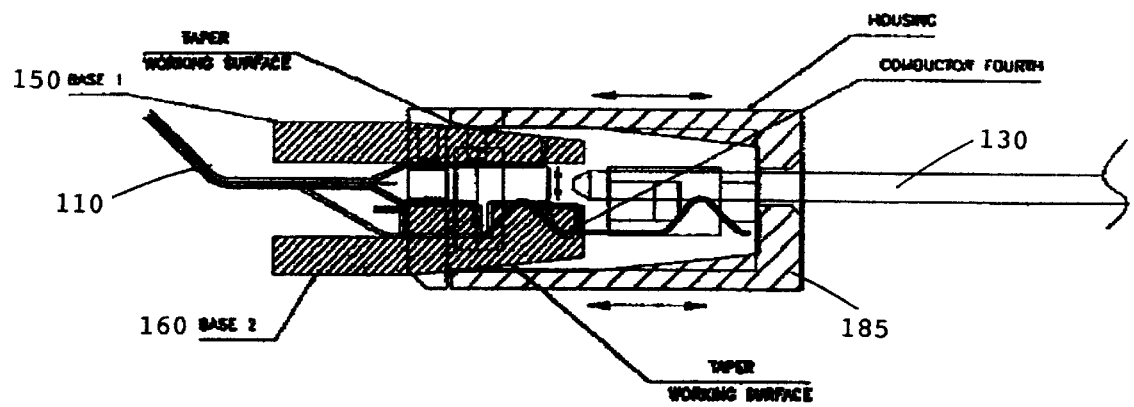
Figure 5C:
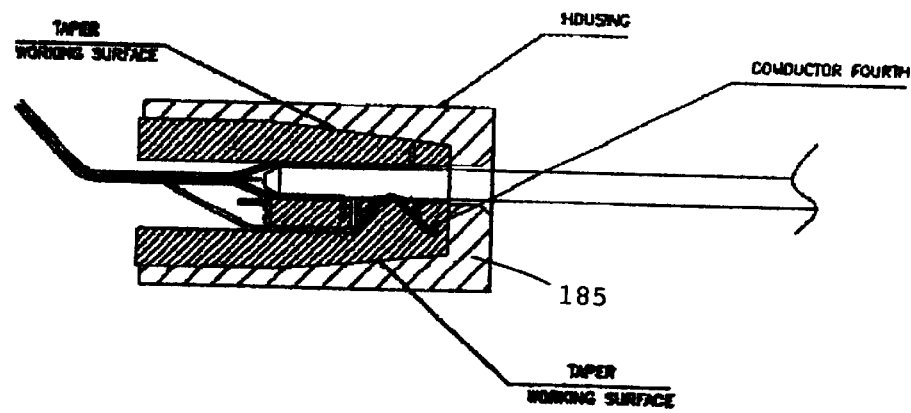

Referring to FIGS. 5A to 5C for a particular locking cartridge 185 of this invention to conveniently and securely lock several terminal layers of the near-zero inductance connector 100 such that the connector can sustain long term reliable operation. Instead of employing the clips 170 and 180 as shown in FIG. 2A, as shown in FIGS. 5A to 5C, the locking cartridge has an opening to receive the tapered end with reduced profile height into the cartridge 185. By pushing the locking cartridge 185 toward the power supply side, the gradually increased profile height of the outer insulation and protection covers 150 and 160 converts a horizontal pushing force to a vertical pressing force. The vertical pressing force is asserted against different input and output terminal layers and the insulation layers of the near-zero inductance connector 100. A simple horizontal pushing movement of the locking cartridge thus securely locks and assembles the near-zero inductance connector into a reliable operational unit without requiring extra mechanical or soldering or bonding processes or components.

According to FIGS. 4 and 5A to 5C, this invention also discloses a direct-current (DC) electric connector 100 that includes plurality of conductive and insulation layers constituting a near-zero inductance connector. The connector 100 further includes a top and a bottom insulation-and-protection covers 150 and 160 covering and protecting the plurality of conductive and insulation layers. The top and bottom insulation-and-protection covers having a tapered outer surface for providing a tapered profile along a horizontal direction toward a connector opening for receiving a printed circuit board 130 into the near-zero inductance connector. The connector 100 further includes a locking cartridge 185 for adaptively enclosing the near-zero inductance connector with the printed circuit board inserted 130 therein. The locking cartridge 185 has top and bottom surfaces each engages the top and bottom insulation-and-protection covers 150 and 160 respectively for horizontally pushing toward a direction having a gradually increased profile height for generating a vertical pressing force. The vertical pressing force is applied to securely pressing and locking the top and bottom insulation-and-protection covers 150 and 160 to the plurality of conductive and insulation layers with the printed circuit board 130 inserted therein The present invention therefore provides a novel configuration and method of design and manufacturing of a connector for providing power to a microprocessor. The novel and improved connector is to significantly reduce the connector inductance during the time when there is a great rate of current variations such that the limitations and difficulties encountered in the prior art can be overcome. Specifically, the present invention provides a connector having a current conduction configuration with the current generated magnetic field canceled out By substantially canceling out the current generated-magnetic field, the inductance is reduced to a very low level. The voltage drop and heat production caused by connector inductance can be significantly reduced. Parallel conductive layers for conducting DC currents are implemented in the novel connector wherein the current generated magnetic fluxes are mutually canceled out This novel configuration is employed on both the input end and the output end such that connector inductance can be substantially eliminated. The connector includes parallel conductive layers for conducting DC currents insulated by a heat conductive insulation layer. Furthermore, the connector is assembled and protected by a heat conductive insulation layer such that heat generated through current conducting in the connector can be more effectively removed.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A direct-current (DC) electric connector comprising:
    an input-end provided for connecting to a DC voltage source and an output end provided for connecting to an electrical device;
    said input end includes an input high-voltage conductive layer and an input low-voltage conductive layer having substantially a same shape and same size and disposed in parallel to and insulated from said input high-voltage conductive layer by an input insulation layer;
    said output end includes an output high-voltage conductive layer and an output low-voltage conductive layer having substantially a same shape and same size and disposed in parallel to and insulated from said output high-voltage conductive layer by an input insulation layer,
    a high voltage connection layer interconnecting said input high voltage conductive layer to said output high voltage conductive layer;
    a low voltage connection layer of substantially same shape and size with said high voltage connection layer and disposed in parallel to and insulated from said high voltage connection layer interconnecting said input low voltage input conductive layer to said output low voltage conductive layer; and
    a first insulation and protection cover overlying said high voltage connection layer and a second insulation and protection cover overlying said low voltage connection layer said first and second insulation-and-protection covers having a tapered outer surface for providing a tapered profile along a horizontal direction toward said output end.

2. The DC electric connector of claim 1 further comprising:
    a locking cartridge for adaptively surrounding said electric connector with a printed circuit of said electronic device inserted therein, said locking cartridge having a top and bottom surfaces each engaging said first and second insulation-and-protection covers respectively for horizontally pushing toward a direction having a gradually increased profile height for generating a vertical pressing force to securely pressing and locking said top and bottom insulation-and-protection covers to said electric connector with said printed circuit board inserted therein.

3. The DC electric connector of claim 1 wherein:
    said input insulation layer and said output insulation layer composed of a material of Kapton.

4. The DC electric connector of claim 3 wherein:
    said input insulation layer and said output insulation layer is an insulation layer with a thickness ranging between 0.01 to 0.05 millimeters.

5. The DC electric connector of claim 2 wherein:
    said first insulation and protection cover and said second insulation and protection cover are composed of a material of Kapton.

6. The DC electric connector of claim 1 wherein:
    said input insulation layer and said output insulation layer composed of a heat conductive insulation material.

7. The DC electric connector of claim 2 wherein:
    said first insulation and protection cover and said second insulation and protection cover are composed of a heat conductive insulation material.

8. A method for manufacturing a direct-current (DC) electric connector comprising:
    (a) forming an input end for connecting to a DC voltage source by forming an input high-voltage conductive layer and an input low-voltage conductive layer having substantially a same shape and size and disposed in parallel to and insulated from said input high-voltage conductive layer by an input insulation layer;

(b) forming an output end for connecting to an electronic device by forming an output high-voltage conductive layer and an output low-voltage conductive layer having substantially a same shape and same size and disposed in parallel to and insulated from said output high-voltage conductive layer by an input insulation layer;

(c) forming a high voltage connection layer interconnecting said input high voltage conductive layer to said output high voltage conductive layer;

(d) forming a low voltage connection layer of substantially same shape and size with said high voltage connection layer and disposed in parallel to and insulated from said high voltage connection layer interconnecting said input low voltage input conductive layer to said output low voltage conductive layer.

(e) forming a top and a bottom insulation-and-protection covers for covering and protecting said electric connector with said top and bottom insulation-and-protection covers having a tapered outer surface for providing a tapered profile along a horizontal direction; and (f) forming a locking cartridge for adaptively surrounding said electric connector, said locking cartridge having a top and bottom surfaces each engaging said top and bottom insulation-and-protection covers respectively for horizontally pushing toward a direction having a gradually increased profile height for generating a vertical pressing force to securely pressing and locking said top and bottom insulation-and-protection covers to said electric connector.

9. The method of claim 8 further comprising:

(g) employing a first insulation and protection cover for overlying said high voltage connection layer and employing a second insulation and protection cover for overlying said low voltage connection layer.

10. The method of claim 8 wherein:

said step of insulating said input high voltage conductive layer from said input low voltage conductive layer by said input insulation layer is a step of disposing a Kapton layer between said input high voltage conductive layer and said input low voltage conductive layer; and said step of insulating said output high voltage conductive layer from said output low voltage conductive layer by said output insulation layer is a step of disposing a Kapton layer between said output high voltage conductive layer and said output low voltage conductive layer.

11. The method of claim 10 wherein:

said step of placing said input insulation layer between said input high voltage conductive layer and said input low voltage conductive layer and said step of placing an output insulation layer between said output high voltage conductive layer and said output low voltage conductive layer is a step of employing an insulation layer with a thickness ranging between 0.01 to 0.05 millimeters.

12. The DC electric connector of claim 10 wherein:

said step of employing said first insulation and protection cover and employing said second insulation and protection cover are steps of employing a material composed of Kapton to form said top and bottom insulation and protection covers.

13. The method of claim 8 wherein:

said step of placing said input insulation layer between said input high voltage conductive layer and said input low voltage conductive layer and said step of placing an output insulation layer between said output high voltage conductive layer and said output low voltage conductive layer is a step of placing a heat conductive insulation layer.

14. The method of claim 9 wherein:

said step of employing said first insulation and protection cover and said second insulation and protection cover are steps of employing said first insulation and protection cover and said second insulation and protection cover composed of a heat conductive insulation material.

15. A data handling system comprising:

a power supply;

a microprocessor supported on a printed circuit board (PCB);

an electric connector connected between said power supply and said microprocessor for providing a direct-current (DC) to said microprocessor;

said electric connector includes a first conductive means for connecting a high voltage terminal of said power supply to a high voltage output terminal on said PCB;

said electric connector further includes a second conductive means for connecting a low voltage terminal of said power supply to a low voltage output terminal on said PCB;

said first conductive means and second conductive means are configured to produce respectively a first current-generated magnetic field and a second current-generated magnetic field wherein said first current-generated magnetic field is substantially canceled out by said second current-generated magnetic field;

said connector further includes a top and a bottom insulation-and-protection covers covering and protecting said connector wherein said top and bottom insulation-and-protection covers having a tapered outer surface for providing a tapered profile along a horizontal direction; and said connector further includes a locking cartridge for adaptively surrounding said electric connector with said PCB inserted therein, said locking cartridge having a top and bottom surfaces each engaging said top and bottom insulation-and-protection covers respectively for horizontally pushing toward a direction having a gradually increased profile height for generating a vertical pressing force to securely pressing and locking said top and bottom insulation-and-protection covers to said connector with said PCB inserted therein.

* * * * *